(12) United States Patent
Gouo et al.

(10) Patent No.: US 6,369,985 B1
(45) Date of Patent: Apr. 9, 2002

(54) HEAD SUSPENSION, HEAD ASSEMBLY, AND DISK APPARATUS HAVING A HEAD IC MOUNTED ON A HEAD SUSPENSION, AND METHOD FOR FITTING A HEAD IC TO A HEAD SUSPENSION

(75) Inventors: Akio Gouo; Hidehiko Kira; Norio Kainuma; Takeshi Ohwe, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/507,816

(22) Filed: Feb. 22, 2000

(30) Foreign Application Priority Data

Jul. 15, 1999 (JP) ............................................. 11-201193

(51) Int. Cl.$^7$ ................................................. G11B 5/48
(52) U.S. Cl. .................................. 360/244.1; 360/245.8
(58) Field of Search ............................ 360/244.1, 245.8

(56) References Cited

U.S. PATENT DOCUMENTS

| | | | | | |
|---|---|---|---|---|---|
| 5,473,488 | A | * | 12/1995 | Gustafson et al. | 360/104 |
| 5,841,609 | A | * | 11/1998 | Tochiyama | 360/104 |
| 5,956,211 | A | * | 9/1999 | Adley | 360/244.1 |
| 6,084,746 | A | * | 7/2000 | Shiraishi et al. | 360/104 |
| 6,134,084 | A | * | 10/2000 | Ohwe et al. | 360/244.1 |
| 6,144,530 | A | * | 11/2000 | Shiraishi et al. | 360/244.1 |
| 6,202,288 | B1 | * | 3/2001 | Shiriashi et al. | 29/603.03 |
| 6,266,213 | B1 | * | 7/2001 | Hiraoka | 360/244.1 |

* cited by examiner

*Primary Examiner*—Jefferson Evans
(74) *Attorney, Agent, or Firm*—Greer, Burns & Crain, Ltd.

(57) ABSTRACT

A head slider and head IC are mounted on a head suspension, the head IC being mounted on a head IC mounting surface. One or more through holes are provided on the head IC mounting surface of the head suspension and the head IC is mounted by injecting a bonding agent between the mounting surface and the head IC through the through holes. The bonding agent is evenly distributed beneath the head IC, so that the head suspension is well balanced.

17 Claims, 6 Drawing Sheets

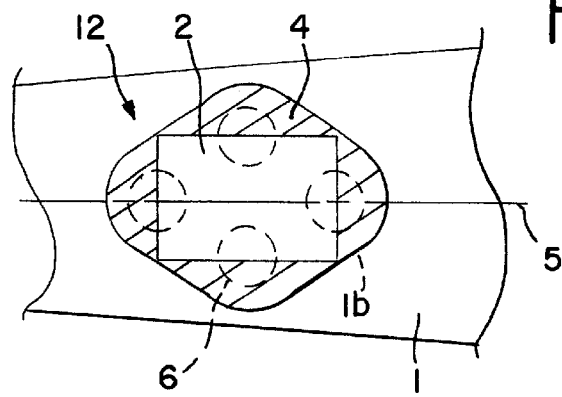
FIG. 9
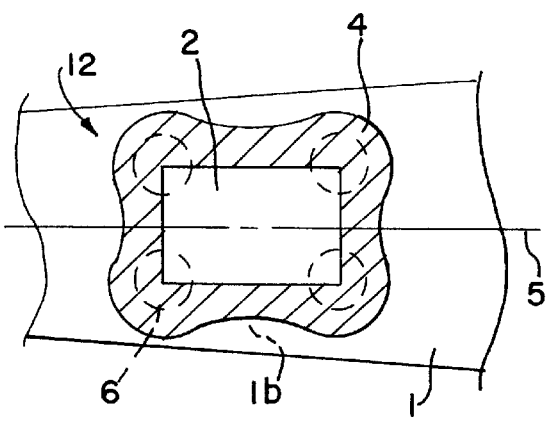
FIG. 10
FIG. 11(a)
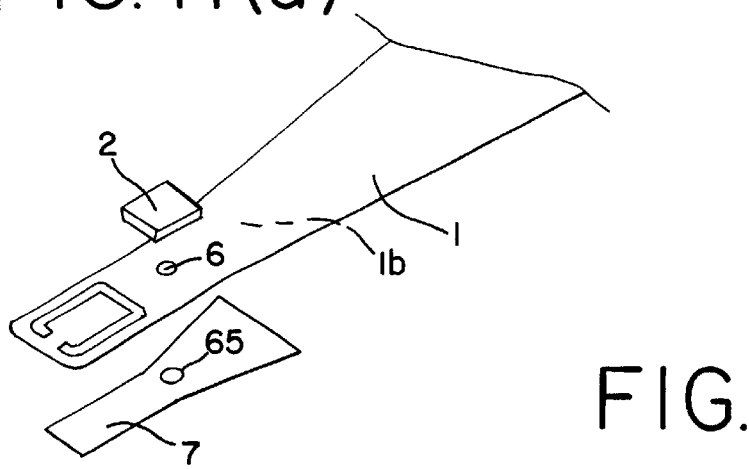
FIG. 11(b)
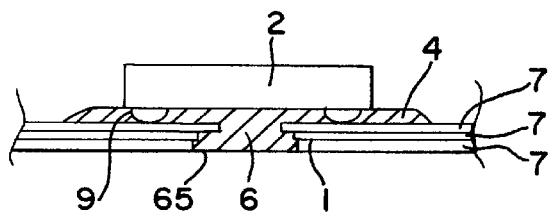

HEAD SUSPENSION, HEAD ASSEMBLY, AND DISK APPARATUS HAVING A HEAD IC MOUNTED ON A HEAD SUSPENSION, AND METHOD FOR FITTING A HEAD IC TO A HEAD SUSPENSION

The present invention relates to a head suspension for supporting a head slider of a disk apparatus, and more particularly to a structure to mount a head IC to a head suspension, to suppress vibration.

BACKGROUND OF THE INVENTION

With increases in the frequency of signals processed by information processing apparatus, disk drive devices must raise the frequency of signals written to a disk medium above the current 70 MHZ, for example, up to 200 to 300 MHZ. In order to raise the frequency of the signals, inductance and static capacitance of the signal line for transmitting the signal between the head slider and head IC must be lowered. For this purpose, the distance between the head IC and head slider can be reduced, to shorten the length of the signal line between these elements.

FIG. 1(a), FIG. 1(b) and FIG. 1(c) illustrate head suspensions of the related art. A head suspension 1 has a head slider 3 at one end part, having an electromagnetic conversion element to write or read information to or from a magnetic disk (not illustrated). Moreover, on the same surface as the surface where the head slider 3 of the head suspension 1 is mounted, a head IC 2 is mounted. The head IC 2 is mounted in the area between the base end and the head slider 3.

As explained above, in the related art, the distance between the head IC and head slider has been reduced by mounting the head IC close to the head suspension. As a result, wiring capacitance and inductance of the signal leads between the head IC and head slider can be reduced so transmission of high frequency signals is possible.

Moreover, as illustrated in FIG. 1(b), the head IC 2 is mounted on the head suspension 1 by a solder bump or gold bump 90 or the like, but an under-fill material 4 is provided between the head IC 2 and head suspension 1 so that the head IC 2 does not float. The under-fill material 4 plays a role of protecting the head IC 2 and bonding to the suspension 1. This under-fill material is injected from a gap between the head suspension 1 and head IC 2 from one side surface of the head IC 2.

In the related art, since the under-fill material 4 is injected from the side surface of the head IC 2, the under-fill material 4 is non-symmetrically distributed in both sides of the center line 5 of the suspension 4, as illustrated in FIG. 1(c). As a result, the load in one side of the center line 5 does not match the load in the other side of the center line 5, and thereby the suspension 1 is twisted. Twisting of the suspension 1 adversely influences the floating characteristic of the head slider 2.

OBJECTS OF THE INVENTION

Therefore, it is a first object of the present invention to enable high frequency transmission of signals for a head slider.

A second object of the present invention is to shorten the length of wiring between the head slider and head IC.

A third object of the present invention to acquire the stable floating of the head slider.

A fourth object of the present invention to simplify the mounting of the head IC and reduce manufacturing cost.

SUMMARY OF THE INVENTION

In the present invention, since the head slider and head IC are formed on the head suspension, the length of wiring between these elements is short and the signal can be transmitted at a higher frequency. The head suspension is provided with a through hole at the surface for mounting the IC head, so that under-fill material can be injected to the area between the head IC and head mounting surface via the through hole, from the surface opposed to the surface where the IC head is mounted. Thereby, the under-fill material equally spreads on the suspension around the through hole, and a load is equally applied to both sides of the center line of the head suspension. As a result, the head suspension is not twisted and stable floating of the head slider can be assured.

Moreover, fluctuation of the spreading of under-fill material can be controlled, in comparison with injection of a large amount of under-fill material through only one through hole, by forming a plurality of through holes at a plurality of positions. If the plurality of through holes are formed symmetrically on both sides of the center line in the longitudinal direction of head suspension, the under-fill material is distributed equally to the right and left sides of the center line of the head suspension in the longitudinal direction, and twisting of the head suspension can effectively be prevented.

Moreover, a head suspension having a plurality of laminated plate members has been developed to increase its strength. Such head suspensions can be provided with a through hole at each plate member, so that the under-fill can be injected easily, and efficiency of the assembling work can also be improved.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 9 is a diagram illustrating the head suspension of the second embodiment of the present invention;

FIG. 10 is a diagram illustrating the head suspension of the third embodiment of the present invention;

FIG. 11(a) is a perspective view of the head suspension of the fourth embodiment of the present invention; and FIG. 11(b) is shows a cross-sectional view of the head suspension of another form of the fourth embodiment of FIG. 11(a).

DETAILED DESCRIPTION OF THE PREFERRED EMBODIMENT

Figure 1A:
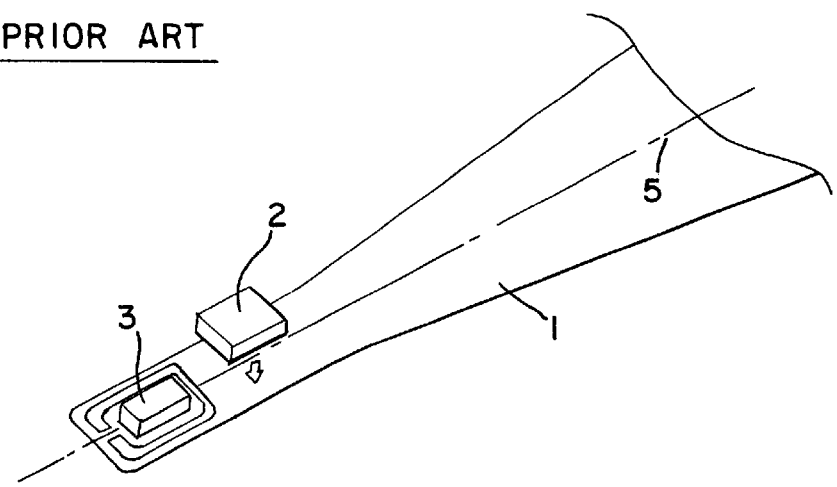
FIG. 1(a) is a perspective view of a head suspension of the prior art.
Figure 1B:
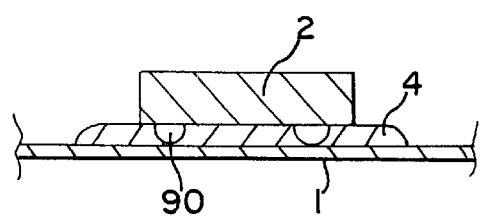
FIG. 1(b) is a cross-sectional view of the head suspension shown in FIG. 1(a) taken along the center line 5.
Figure 1C:
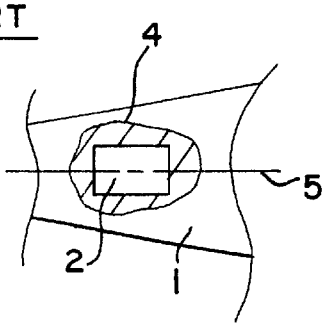
FIG. 1(c) is a plan view of the area near the head IC shown in FIG. 1(a)
Figure 2:
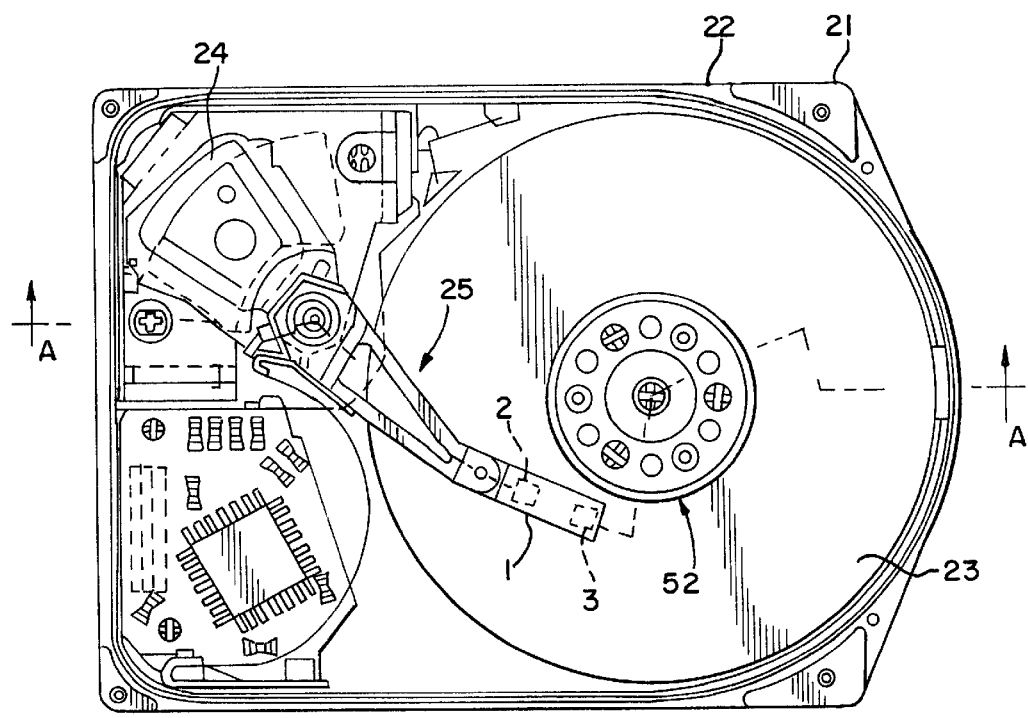
FIG. 2 is a plan view of a magnetic disk apparatus for use with the present invention.
Figure 3:
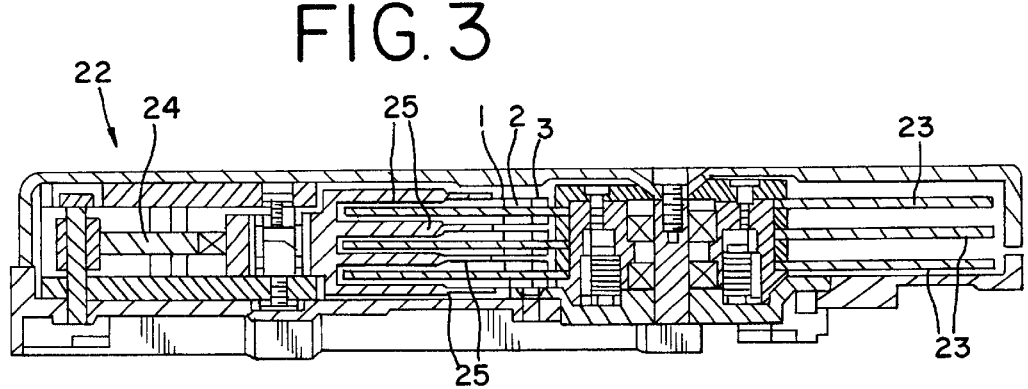
FIG. 3 is cross-sectional view of the magnetic disk apparatus of FIG. 2.

FIG. 2 and FIG. 3 illustrate a magnetic disk apparatus 21 having a head suspension of the present invention. A magnetic disk apparatus 21 accommodates, within a housing 22, a plurality of magnetic disks 23, and an actuator 24 having a coil and a permanent magnet (not illustrated). The actuator 24 is driven by an electromagnetic force. A plurality of arms 25 are rotated by the actuator 24. Head suspensions 1 are mounted at the end part of each arm 25. The head suspensions 1 have a spring property in the direction parallel to the rotating shaft in the center of the magnetic disks 23. At the surface opposed to the disk, and at the end part of each head suspension 1, a head slider 3 having an electromagnetic conversion element (not illustrated) to record and reproduce information to or from the magnetic disk 23 is mounted. Also, a head IC 2 is mounted at the surface opposed to the disk in the intermediate area of the head suspension 1. The head IC 2 controls the electromagnetic conversion element in the head slider 3.

In the magnetic disk apparatus illustrated in FIG. 2 and FIG. 3, the arm 25 is rotated by the actuator 24 integrally with the head suspension 1. The head slider 3 mounted to the head suspension 1 is accessed to a predetermined track of the magnetic disk 23 to record or read information to or from the magnetic disk 23.

Figure 4:
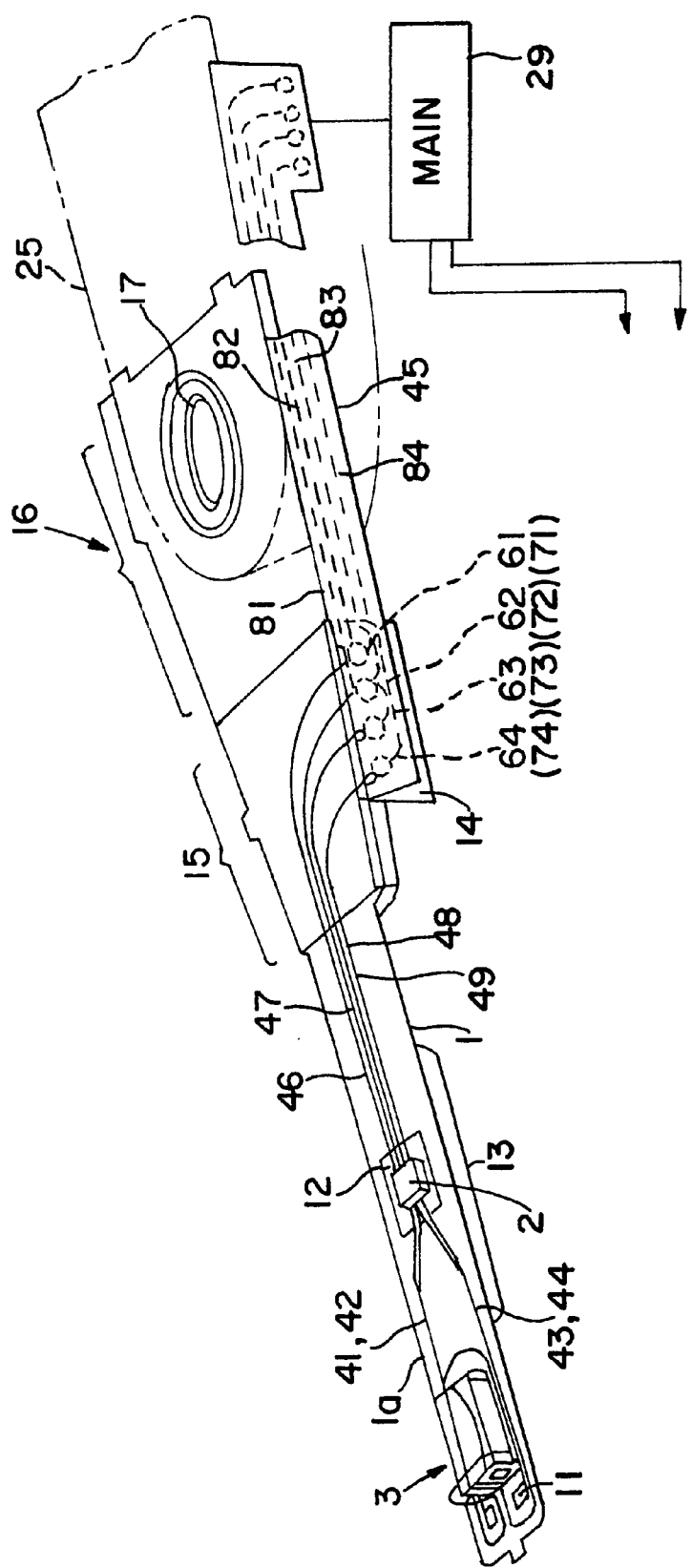
FIG. 4 is a perspective view of a head suspension of the first embodiment of the present invention.

FIG. 4 is a perspective view of the head suspension of the present invention.

The head suspension 1 is formed by a flat plate of stainless steel. The length up to the base end from the end part is about 10 mm to 25 mm, and the thickness is about 10 $\mu$m to 80 $\mu$m.

At the front end of the head suspension 1, a head slider mounting part 11 having a gimbal structure is provided, and a head slider 3 having the electro-magnetic conversion element (not illustrated) is mounted to the head slider mounting portion 11.

At the base end side of the head suspension 1, a mounting portion 15 which is in contact with a spacer 16 is provided. The head suspension 1 is fixed to the spacer 16 by welding or the like. The head suspension 1 is mounted to the arm 25 via this spacer 16. A single side edge of the mounting portion 15 is bent at a right angle to form a tongue portion 14. The spacer 16 is preferably a flat plate of stainless steel and it allows formation of a caulking hole 17 for fixing the head suspension 1 by a caulking process. The thickness of the spacer is about 0.1 mm to 0.3 mm and the diameter of the caulking hole 17 is about 0.15 mm to 0.3 mm.

A head IC mounting means 12 is provided between the base end and front end of the head suspension 1, and the head IC 2 is mounted thereto. Both side edges of the head IC mounting means 12 in the head suspension 1 are bent at a right angle to form a rib 13, for rigidity.

At an upper surface 1a of the head suspension 1 to which the head slider 11 and head IC 12 are mounted, signal lines 41 to 44 for transmitting signals are laid. The signal lines 41 to 44 are laid between the head slider mounting means 11 and head IC mounting means 12, while signal lines 46 to 49 are laid between the head IC mounting means 12 and the tongue means 14 explained previously. At the end portion of the wiring patterns 46, 47, 48, 49 in the tongue portion 14, the electrodes 61, 62, 63, 64 are respectively formed.

The tongue portion. 14 is attached with a flexible printed circuit (FPC) 45 to relay the signal to be transmitted between the main IC 29 and head IC 2 within the housing 21. The FPC 45 is formed in a belt shape with a width of about 1 mm. The signal lines 81 to 84 extend in the longitudinal direction of the head suspension 1, and are covered with a polyamide covering material. At the end portions of the signal lines 81, 82, 83 and 84 of the FPC 45 pad electrodes 71, 72, 73 and 74 are formed. The pads 72, 72, 73, 74 are in contact with the pad electrodes 61, 62, 63, 64 formed at the tongue portion 14. The other end of the FPC 45 is connected to the main IC 29 mounted to the circuit substrate (not illustrated) attached to the arm 25. The main IC 29 includes a recording circuit, a reproducing circuit and an amplifying circuit or the like.

Figure 5:
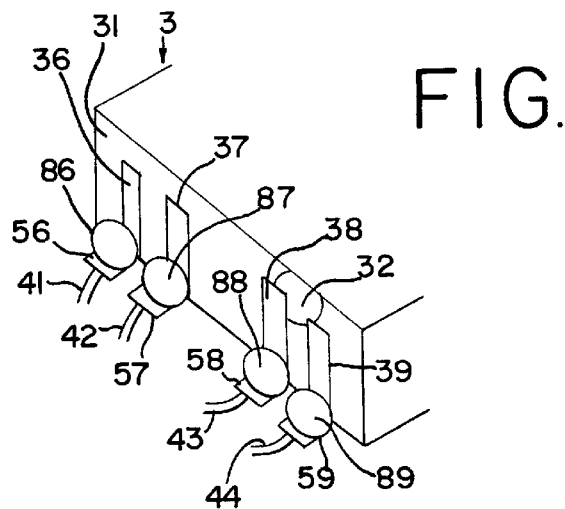
FIG. 5 is a diagram illustrating head slider mounting means of the head suspension of FIG. 4.

FIG. 5 is an enlarged view of the head slider mounting means 11. At the head slider mounting means 11, pad electrodes 56 to 59 are formed. The signal lines 41, 42, 43, 44 are respectively led from the electrodes 56, 57, 58, 59 and extended up to the head IC mounting means 12. At the end surface 31 of the head slider 3, an electro-magnetic conversion element 32 consisting of an inductive element (not illustrated) for recording information to a magnetic disk 23 and a magneto-resistive head (not illustrated) for reproducing information recorded in the magnetic disk 23 is formed by thin film forming techniques. Each head forming the electromagnetic conversion element 32 has the terminals 36 to 39 at its end surface. The head slider 3 is fixed to the head slider mounting means 11 by an appropriate bonding agent. The terminals 36, 37, 38, 39 are electrically connected to the electrodes 56, 57, 58, 59 via thermally deposited Au bumps 86,87,88 and 89.

Figure 6:
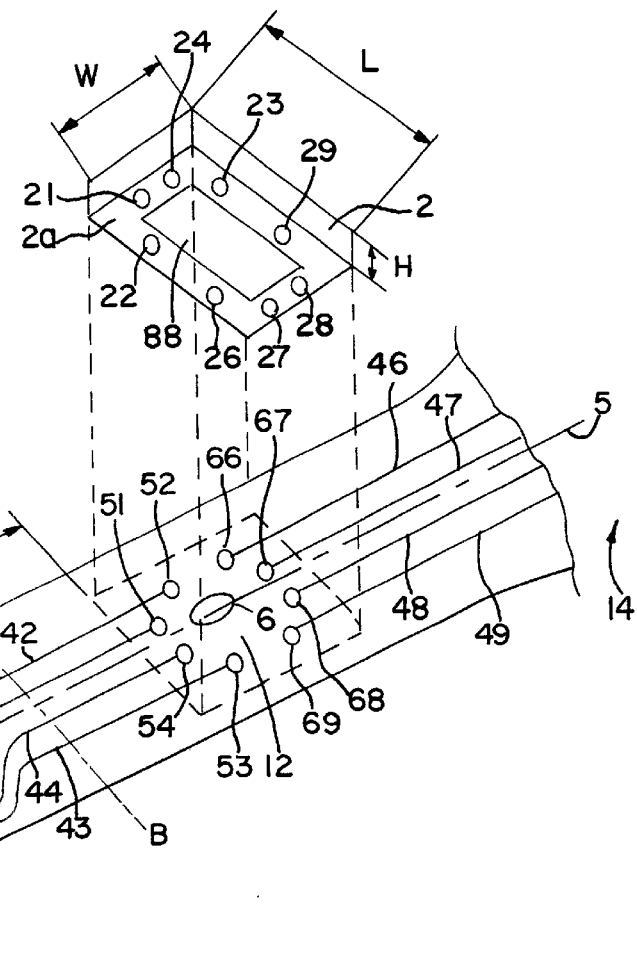
FIG. 6 is a diagram illustrating the head IC mounting means of the head suspension of FIG. 4.

FIG. 6 is an enlarged view of the head IC mounting means 12 and its periphery. A through hole 6 having a circular edge is provided to the head IC mounting means 12. The through hole 6 has a diameter of about 0.3 mm to 1.0 mm and is formed on the center line 5 in the longitudinal direction of the suspension 1. The edge of the through hole 6 is not limited only to a circular shape, and it may have an elliptical or square shape, or any other suitable shape.

The head IC 2 is mounted to the head IC mounting means 12 to cover the through hole 6. The head IC 2 is preferably a non-sealed bare chip having a thickness H of about 0.1 mm to 0.25 mm, a width W of about 0.7 mm to 1.5 mm, a length L of about 0.7 mm to 1.5 mm, and a weight G of about 0.1 mg to 1 mg. On the other hand, a side of the existing head IC sealed by ceramics or resin or the like has a size of about 5 mm, a thickness of about 1.5 mm, and a weight of about 0.5 mg. Therefore, influence applied to the head suspension characteristic can be alleviated to a large extent by mounting the head IC to the head suspension in the bare chip condition.

Moreover, the pad electrodes 51 to 54 and 66 to 69 are formed to surround the through hole. The pad electrodes 51 to 54 and 66 to 69 are shown arranged along each side of a virtual square shape on the head IC mounting means 12. The pad electrodes 51, 52, 53, 54 are formed at the end portions of the signal lines 41, 42, 43, 44 laid in the area between the head slider mounting means 11 and head IC mounting means 12. The pad electrodes 66, 67, 68, 69 are respectively formed at the end portions of the signal lines 46, 47, 48, 49 laid between the head slider mounting means 12 and tongue portion 14.

The head IC 2 allows formation of an integrated circuit 88 at the surface 2a opposed to the head suspension 1. The integrated circuit 88 is covered with a protection film. At a lower surface 2a, the terminals 21 to 24, 26 to 29 are formed along each side of the head IC 2. The terminals 21, 22, 23, 24 are respectively in electrical contact with the pad electrodes 51, 52, 53, 54 arranged in the head IC mounting means 12, and the terminals 26, 27, 28, 29 are respectively in electrical contact with the pad electrodes 66, 67, 68, 69 arranged to the head IC mounting means 12. The integrated circuit 88 amplifies the signal reproduced by the electromagnetic conversion element 32 illustrated in FIG. 5.

Figure 7:
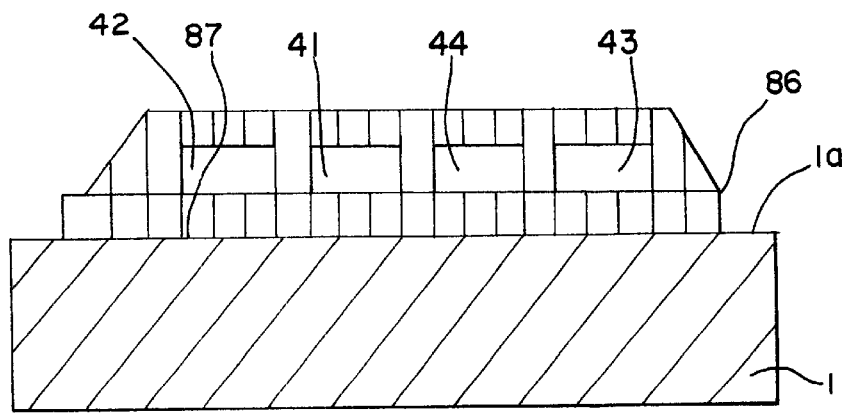
FIG. 7 is a cross-sectional view of the signal lines on the head suspension of FIG. 4.

FIG. 7 is a cross-sectional view along the line B—B of the head suspension 1 illustrated in FIG. 6.

As illustrated in FIG. 7, the signal lines 41 to 44 are formed on the polyamide base layer 86 laminated in the thickness of about 3 $\mu$m to 1.0 $\mu$m at the upper surface 1a of the head suspension 1, and is covered with the polyamide covering layer 87 in the thickness of about 1 $\mu$m to 10 $\mu$m in the same material as the base layer 86.

A distance D (FIG. 6) between the head slider mounting means 11 and head IC mounting means 12 can be as short as about 0.5 mm to 1.0 mm and the length of the signal lines 41 to 44 is also short. Therefore, the inductance of the signal lines and the static capacitance between signal lines are also small, and high frequency signals can be transmitted at a higher speed.

Figure 8:
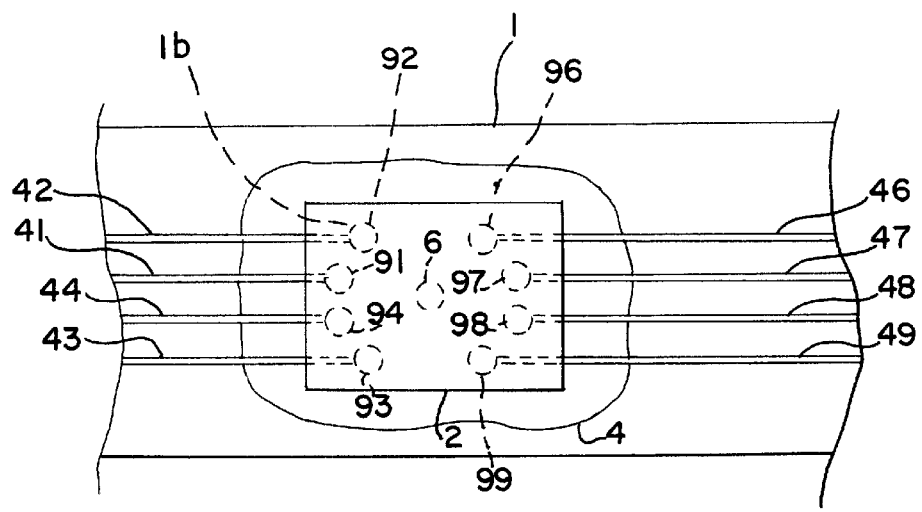
FIG. 8 is a diagram of the head IC mounted to the head suspension.

FIG. 8 is a plan view of the head IC 2 mounted to the head suspension. The terminals 21 to 24 and 26 to 29 of the head IC 2 (FIG. 6) are in electrical contact with the pad electrodes 51 to 54 and 56 to 59 via the bumps 91 to 94 and 96 to 99 (FIG. 8). After the head IC is mounted to the head IC mounting means 12 of the head suspension 1, the under-fill material 4 is injected to the head IC mounting means 12 from a rear surface 1b of the head suspension 1 via the through hole 6. As a result, the through hole 6 is filled with the under-fill material 4. The under-fill material 4 may be composed of ultraviolet ray setting resin and thermosetting resin, and it can be injected for bonding the protection head of head IC 2 and the head IC 2 to the head suspension 1. The weight of the under-fill material used for bonding of one head IC is about 30 mg to 100 mg.

As illustrated in FIG. 8, the under-fill material 4 injected from the through hole 6 spreads across a sector on the head IC mounting means 12 with the through hole 6 defining the center. Since the through hole 6 is formed on the center line 5 in the longitudinal direction of the head suspension 1, as explained previously, the under-fill material 4 spreads symmetrically in the right and left direction around this center line 5. Therefore, a load by the under-fill material 4 is equally applied to both right and left sides of the center line 5 and therefore the head suspension 1 is not twisted. Moreover, the edges in both sides of the head IC mounting means 12 of the head suspension are bent and the rigidity thereof is higher than that of the peripheral area of the head IC mounting means 10. Therefore, it does not influence the head suspension characteristic when the head IC 2 is mounted.

FIG. 9 is a plan view of the head suspension in the second embodiment of the present invention.

In this embodiment, a plurality of through holes 6 are provided at each of four positions. Each through hole 6 is formed at the center of each side of the virtual square shape on the head IC mounting means 12. Moreover, the through holes 6 are formed symmetrical to the center line 5 in the longitudinal direction of the head suspension 1. The size of the through holes 6 in the second embodiment can be equal to that of the through hole explained in the first embodiment. Moreover, like the first embodiment, the under-fill material 4 is injected via the through holes 6 from the lower surface 1b of the head suspension 1. In the second embodiment, as illustrated in FIG. 6, the pad electrodes 51 and 52 are formed to avoid the through holes 6 in the area covered with the head IC 2 on the head IC mounting means 12.

According to the second embodiment, since the through holes 6 from which the under-fill material 4 is injected are formed at a plurality of positions, distribution of under-fill material 4 can be adjusted easily. Moreover, since the through holes 6 are formed at line symmetrical positions from the center line 5 of the head suspension 1, the under-fill material 4 can be distributed equally to the right and left sides of the center line 5.

FIG. 10 is a plan view of the head suspension of the third embodiment of the present invention. In this embodiment, a through hole 6 is provided at four positions like the second embodiment. Each through hole 6 is formed at the four corners of a virtual square shape on the head IC mounting means 12. Moreover, the through holes 6 are formed at line symmetrical positions around the center line 5 in the longitudinal direction of the head suspension 1. The size of the through holes 6 in the third embodiment can be identical to that of the through hole of the first and second embodiments. In addition, like the first and second embodiments, the under-fill material 4 is injected via the through hole 6 from the lower surface 1b of the head suspension 1. In the third embodiment, the pad electrodes 51 and 52 (FIG. 6) are formed to avoid the through holes 6 in the area covered with the head IC 2 on the head IC mounting means 12.

According to the third embodiment, since the through holes 6 from which the under-fill material 4 is injected are formed at a plurality of positions, distribution of the under-fill material 4 can be adjusted easily as in the case of the second embodiment. Moreover, since the through holes 6 are formed at symmetrical positions from the center line 5 of the head suspension 1, the under-fill material 4 can be distributed equally to the right and left sides for the center line 5.

FIGS. 11(a) and 11(b) illustrate the head suspension of the fourth embodiment of the present invention. In the fourth embodiment, a reinforcing plate 7 is stacked on the lower surface 1b of the front end portion of the head suspension 1. The reinforcing plate 7 is formed of stainless steel as in the case of the head suspension 1 and has thickness of about 25 $\mu$m to 100 $\mu$m. The reinforcing plate 7 is mounted to the head suspension 1, providing a gap of 10 $\mu$m to 20 $\mu$m against the head suspension 1 by the welding or pressure bonding method.

A through hole 6 having a circular or other suitable edge is also formed to the reinforcing plate 7 like the head suspension 1. When the reinforcing plate 7 is mounted to the head suspension 1, the center of the through hole 6 is matched with the center of a plate through hole 65. The size of the through hole 65 may be equal to that of the through hole 6 of the head suspension 1, but it is preferably larger than the through hole 6. Since the under-fill material 4 is injected from the through hole 65 in the side of reinforcing plate 7, the under-fill material 4 can flow easily into the gap between the head suspension 1 and head IC 2 by making the through hole 65 larger than the through hole 6. According to the structure of the fourth embodiment, the under-fill material 4 also flows into the gap between the head suspension 1 and reinforcing plate 7. Therefore, the under-fill material 4 also functions as the damper material to improve the vibration characteristic of the head suspension 1.

In the fourth embodiment, only one sheet of reinforcing plate 7 is used, but it is also possible to stack a plurality of plates 7 having the through holes at the lower surface 1b of the head suspension 1. Even in this structure, the under-fill material flows into the gaps between reinforcing plates and thereby good vibration characteristic of the head suspension 1 can be obtained. Moreover, as illustrated in FIG. 11(b), the under-fill material 4 can easily flow into the gap between the head suspension 1 and head IC 2 when a size of the through holes are set to progressively smaller values as the reinforcing plates are located nearer to the head suspension.

According to the present invention, since the length of signal lines between the head IC and head slider can be shortened, phenomenon such as distortion or interference of the signal waveform becomes less likely to occur and thereby high speed operation becomes possible. Moreover, since the under-fill material for fixing the head IC to the head suspension can be distributed equally on the head suspension, twisting of the head suspension is no longer generated and thereby the floating characteristic of the head slider may be improved.

While the principles of the invention have been described above in connection with specific apparatus and applications, it is to be understood that this description is made only by way of example and not as a limitation on the scope of the invention.

What is claimed is:

1. A head suspension having a substantially flat shape and supporting a head slider, and a head IC for controlling said head slider, the head IC being supported on a head IC mounting surface of the head suspension, wherein a through hole is formed on the head IC mounting surface on which the head IC is mounted and the head IC is bonded to the head IC mounting surface by injecting a bonding agent to said through hole such that said injected bonding agent is evenly balanced on the head suspension.

2. The head suspension as claimed in claim 1, wherein said through hole has a diameter of 1 mm or less.

3. The head suspension as claimed in claim 1, wherein a plurality of through holes are formed on said head IC mounting surface.

4. The head suspension as claimed in claim 3, wherein said through holes are formed symmetrically in the right and left sides of a center line of the head suspension in the longitudinal direction.

5. The head suspension as claimed in claim 3, wherein said through holes are formed symmetrical in the top and bottom sides of a center line of the head suspension in the longitudinal direction.

6. The head suspension as claimed in claim 3, wherein the head IC mounting surface includes four sides forming four corners on the surface.

7. The head suspension as claimed in claim 6 wherein said through holes are formed symmetrical on the four sides of the head IC mounting surface.

8. The head suspension as claimed in claim 6 wherein said through holes are formed symmetrical on the four corners of the head IC mounting surface.

9. The head suspension as claimed in claim 1, wherein a plurality of plate members are laminated, each of said plate members having a plate aperture aligned with said through hole, said apertures being larger in size than said through hole and having a progressively reduced size as said plate members come closer to the head IC.

10. The head suspension as claimed in claim 9, wherein said plate members have a gap between each other, and bonding agent fills the gaps.

11. The head suspension as claimed in claim 1, wherein said head slider and said head IC are mounted on a common surface of the head suspension.

12. The head suspension as claimed in claim 1, further comprising a plurality of pads to which electrodes of said head IC are in contact around said through hole.

13. The head suspension as claimed in claim 1, wherein said through hole is symmetrically formed on the head IC mounting surface such that said injected bonding agent is equally distributed, allowing even balance on the suspension.

14. The head suspension as claimed in claim 1, wherein said through hole is formed on a center line of the head suspension in the longitudinal direction.

15. The head suspension as claimed in claim 1, wherein said through hole is formed at the center of the head IC mounting surface.

16. A method for fitting a head IC to a head suspension to support the head IC, comprising the steps of:
   mounting the head IC over a through hole provided through front and rear surfaces of said head suspension; and
   injecting a bonding agent via said through hole to the head suspension surface on which said head IC is mounted;
   wherein said injected bonding agent is evenly balanced on the head suspension.

17. A disk apparatus comprising:
   a disk for recording information;
   a head slider for writing or reading information to or from said disk;
   a head IC for controlling said head slider;
   a head suspension for supporting said head slider and said head IC to mount said head IC over a through hole via a bonding agent, with said bonding agent being evenly balanced on the head suspension; and
   an actuator for supporting said head suspension to drive said head slider in the radial direction of said head slider.

* * * * *